US011912595B2

(12) United States Patent
Pu et al.

(10) Patent No.: US 11,912,595 B2
(45) Date of Patent: Feb. 27, 2024

(54) GROUNDWATER CIRCULATION WELL SYSTEM WITH PRESSURE-ADJUSTABLE HYDRODYNAMIC CAVITATION

(71) Applicant: CHENGDU UNIVERSITY OF TECHNOLOGY, Sichuan Province (CN)

(72) Inventors: Shengyan Pu, Sichuan Province (CN); Hui Ma, Sichuan Province (CN); Yuming He, Sichuan Province (CN); Xiaoguang Wang, Sichuan Province (CN); Guangyong Zeng, Sichuan Province (CN); Yi Chen, Sichuan Province (CN); Dong Yu, Sichuan Province (CN); Wenwen Ji, Sichuan Province (CN)

(73) Assignee: CHENGDU UNIVERSITY OF TECHNOLOGY, Chengdu (CN)

( * ) Notice: Subject to any disclaimer, the term of this patent is extended or adjusted under 35 U.S.C. 154(b) by 0 days.

(21) Appl. No.: 18/112,588

(22) Filed: Feb. 22, 2023

(65) Prior Publication Data
US 2023/0271861 A1    Aug. 31, 2023

(30) Foreign Application Priority Data

Feb. 28, 2022 (CN) .......................... 202210191034.8
May 26, 2022 (CN) .......................... 202210595755.5

(51) Int. Cl.
*C02F 1/72* (2023.01)
*C02F 1/34* (2023.01)

(52) U.S. Cl.
CPC . *C02F 1/72* (2013.01); *C02F 1/34* (2013.01)

(58) Field of Classification Search
CPC .... C02F 1/72; C02F 1/34; C02F 1/722; C02F 2101/30; C02F 2103/06; C02F 2305/023;
(Continued)

(56) References Cited

U.S. PATENT DOCUMENTS

| 5,595,644 A | 1/1997 | Doring et al. |
| 2006/0060464 A1 | 3/2006 | Chang |
| 2016/0054031 A1 | 2/2016 | Echart |

FOREIGN PATENT DOCUMENTS

| CN | 101851021 A | 10/2010 |
| CN | 201643998 U | 11/2010 |

(Continued)

OTHER PUBLICATIONS

English language machine translation of DE102007052642A1, 9 pages, No Date.*

(Continued)

*Primary Examiner* — Pranav N Patel
(74) *Attorney, Agent, or Firm* — Miles & Stockbridge PC; Ajay A. Jagtiani (57) ABSTRACT

The present invention relates to a groundwater circulation well system with pressure-adjustable hydrodynamic cavitation, including a circulation well body, a sucked and injected water circulation assembly and a hydrodynamic cavitator. The sucked and injected water circulation assembly is based on a water suction and injection pump. The hydrodynamic cavitator is provided, inside a vortex chamber, with a vortex water inlet column capable of changing a water passing aperture. The hydrodynamic cavitator is capable of changing a bubbling pressure and a breaking pressure of hydrodynamic cavitation bubbles in the vortex water inlet column. The hydrodynamic cavitator generates vortices in the circulation well body to accelerate uniform mixing of a remediation agent and the groundwater. Energy from collapsing and bursting of the hydrodynamic cavitation bubbles activates the remediation agent such that contaminants in the groundwater are efficiently degraded.

8 Claims, 4 Drawing Sheets

(58) Field of Classification Search
CPC .. C02F 2305/026; Y02W 10/10; B09C 1/002; B09C 1/08; B09C 2101/00
See application file for complete search history.

(56) References Cited

FOREIGN PATENT DOCUMENTS

| | | |
|---|---|---|
| CN | 201988344 U | 9/2011 |
| CN | 204324933 U | 5/2015 |
| CN | 206126899 U | 4/2017 |
| CN | 108655160 A | 10/2018 |
| CN | 212121196 U | 12/2020 |
| CN | 113277577 A | 8/2021 |
| CN | 215143328 U | 12/2021 |
| CN | 115259304 A | 11/2022 |
| DE | 102007052642 A1 * | 6/2009 |
| EP | 0578925 A1 | 1/1994 |
| JP | H0647665 A | 2/1994 |
| JP | 2006043670 A | 2/2006 |
| JP | 2012035181 A | 2/2012 |
| WO | 2012041766 A1 | 4/2012 |

OTHER PUBLICATIONS

Chinese First Office Action in corresponding Application No. 202210595755.5 dated Jan. 11, 2023.

* cited by examiner

GROUNDWATER CIRCULATION WELL SYSTEM WITH PRESSURE-ADJUSTABLE HYDRODYNAMIC CAVITATION

TECHNICAL FIELD

The present invention relates to the field of environmental protection technology, in particular to the field of groundwater contamination in-situ remediation technology, specifically a groundwater circulation well system with pressure-adjustable hydrodynamic cavitation.

BACKGROUND

With rapid economic development, soil and groundwater contamination is increasing with each passing day. Contaminants in soil and groundwater mainly originate from chemical, smelting, textile printing and dyeing and electroplating industries, etc., and contamination is mainly classified into heavy metal contamination and organic contamination according to contaminant types. Traditional water contamination treatment methods include: grating, mixing, flocculation, sedimentation, flotation, filtration and other physical methods; chemical precipitation, adsorption, disinfection, chemical oxidation and other chemical methods; activated sludge process and biofilm process and other biological methods. However, industrial development results in that the types of organic matters difficult to degrade by traditional methods increase year by year, so wet air oxidation (WAO), catalytic wet oxidation (CWAO), supercritical water oxidation (SCWO), membrane technology, acousto-optical coupled oxidation and other technologies are also applied in the field of water contamination treatment. At present, soil and groundwater remediation technologies mainly include fixation stabilization, soil washing, chemical redox, thermal desorption and bioremediation, etc., and are classified into in-situ remediation and ex-situ remediation according to whether contaminants are transferred.

Circulation well technology is an in-situ remediation technology that artificially changes water pressure distribution in a well by extracting groundwater in the well by means of aeration or hydraulic power to form a pressure differential disturbance and create a vertical circulation flow, such that contaminated groundwater around the circulation well is driven into a well body, and volatile and semi-volatile organics are blown off and removed in the well. Other contaminants for which a circulation well can be used for remediation include halogenated and non-halogenated volatile organic compounds, semi-volatile organic compounds, petroleum products, pesticides and other contaminants such as benzene, toluene, ethylbenzene and xylenes. In design, a groundwater circulation well extracts groundwater in an aquifer from one screen segment of the circulation well to the interior of the well and discharges it from another screen segment, thereby producing an in-situ vertical groundwater circulation flow in the aquifer around the circulation well. A pressure gradient difference between the two screen segments in the circulation well is a driving force for the circulation flow. The circulation well technology has a small disturbance for a groundwater level, a small footprint of auxiliary facilities and low operational energy consumption, and has a good potential for application in groundwater organic contamination remediation projects Early circulation well technology remediates contaminated groundwater mainly by vapor extraction and bio-enhanced degradation, and has the disadvantages of a long remediation cycle and high selectivity of contaminants. For example, using vapor extraction circulation well technology, non-volatile and weakly volatile organics are difficult to remove; and using bio-enhanced degradation circulation well technology, the effect of removing highly toxic and refractory organics is not good. In-situ chemical oxidation circulation well technology at the present stage has low selectivity for contaminants, high decontamination efficiency and a broad application prospect. However, it has the following shortcomings: first, the contact between an agent and contaminants is not sufficient, and repeated dosing is liable to cause waste, resulting in an excessive $SO_4^{2-}$ and $H^+$ ion content in water and increased corrosiveness; second, there is no continuous agent activation method adapted to the groundwater environment, and the decontamination performance of an agent is not fully demonstrated, so other technologies need to be used in combination to make up for the shortcomings.

Cavitation technology is a novel water treatment technology that has emerged in recent years, and is generally classified into acoustic cavitation, particle cavitation, optical cavitation and hydrodynamic cavitation, based on the form in which cavitation is generated. In hydrodynamic cavitation technology, operating conditions of low pressure intensity and a high flow velocity are created by reducing a flow pipe diameter. When a local liquid pressure is lower than a saturated vapor pressure corresponding to a current temperature of a liquid, hydrodynamic cavitation bubbles are generated within the liquid or at a solid-liquid interface. The hydrodynamic cavitation bubbles collapse and burst after entering a high-pressure-intensity and low-flow-velocity region, and generate a high temperature and a high pressure at the instant of bursting. The instant high temperature and high pressure leads to "aqueous phase combustion" decomposition of organics at a gas-liquid phase junction of the hydrodynamic cavitation bubbles. At the same time, a large number of ions accumulate on gas-liquid interfaces of the collapsed hydrodynamic cavitation bubbles, such that active substances such as ·OH and $H_2O_2$ with high activity and good oxidation property can be produced, which directly oxidize dissolved or volatilized organic contaminants. A hydrodynamic shear force generated by the breakage of the hydrodynamic cavitation bubbles facilitates cleavage of carbon bonds in main chains of macromolecular organic compounds. The collapse and burst of the hydrodynamic cavitation bubbles increases the specific surface area, such that organics in the groundwater diffuse to low concentration regions such as the interior of the hydrodynamic cavitation bubbles under the drive of a concentration difference, thus accelerating volatilization. Hydrodynamic cavitation technology is characterized by low energy consumption, simple equipment, low selectivity, environmental friendliness, etc.

Patent document CN212121196U discloses a multi-layer circulation well system for soil and groundwater remediation. The circulation well system includes one or more injection wells. A plurality of packers arranged in a vertical direction are provided in the injection well and divide the injection well into a packing segment, a hole sealing segment, an injection layer and an extraction layer. Each packer is fixed by a middle sleeve vertically arranged in the center of the injection well; each packer is connected with external hydraulic control equipment through a control inner pipe; an electric valve is used for controlling a circulation mode to enhance circulation disturbance, such that multiple groundwater circulation modes are formed, and multi-dimensional circulation disturbance is achieved, and well walls of the extraction layer and each injection layer are of a screen pipe structure including a filtering layer; a submersible pump is provided in the pumping layer; and an injection tube injects water and a remediation agent into each injection layer. In the utility model, by layering a groundwater aquifer and injecting agents separately, agent injection is more targeted, but the mixing ability of the agent and contaminants in each layer is still not improved.

Patent document CN215143328U discloses a groundwater circulation well coupled in-situ chemical oxidation injection device, which includes a groundwater circulation well main body and a reinjection water pipe. The reinjection water pipe is installed on an inner wall of the groundwater circulation well main body in a threaded fit manner. An agent storage tank is welded to an upper end of an inner wall of a left side of the groundwater circulation well body. A first agent injection tube is welded to a bottom end of the agent storage tank, and a peristaltic pump is installed in the middle of the first agent injection tube in a threaded fit manner. A right side of the first agent injection tube is welded to the reinjection water pipe. Sleeve shells are provided on the periphery of the outer side of the groundwater circulation well main body, and agent injection tanks are provided in the sleeve shells. Second agent injection tubes are welded to equal sides of the four sets of agent injection tanks, and the second agent injection tubes penetrate through sealing cotton. The second chemical injection pipes discharge into the groundwater circulation well main body. The device implements repeated dosing by increasing the number of injection ports, but the activation and degradation performance of a remediation agent itself is not enhanced.

Patent document CN201643998U discloses a hydrodynamic cavitation device, which includes a tubular main body, an equal-diameter outlet segment, and an equal-diameter inlet segment, a conical tapering segment, a necking port, a conical splaying segment and an equal-diameter tail end segment which are successively communicated with each other and are coaxial to each other. An aeration pipe is provided in the equal-diameter inlet segment and the conical tapering segment, and a barrier device is provided in the conical splaying segment. In this device, by adding an aeration device to replenish the air nucleus inside a water flow, bubble generation is accelerated and the number of bubbles produced is increased, but the device cannot change the cavitation pressure and cannot produce an optimal cavitation effect for contaminated groundwater whose physical properties change due to being at different points and different remediation time periods.

Patent document CN201988344U discloses a combined hydrodynamic cavitator, which includes a submerged body mounted in a circular pipeline and implementing wake flow cavitation, a pore plate implementing jet flow hydrodynamic cavitation, and a reed implementing vibration cavitation. The submerged body is located upstream in the circular pipeline and is at a central position of the circular pipeline, and the submerged body is fixedly connected with the circular pipeline through a submerged body fixing bracket; the pore plate is fixedly connected with the circular pipeline and is mounted between the submerged body and the reed, and the pore plate is provided with a plurality of jet flow inlet holes; the reed is fixedly connected with the circular pipeline through a reed fixing bracket and a reed fixing base; the reed fixing base is provided with an axial slit; the reed with a tip is embedded and fixed into the slit; and the tip of the reed directly faces a central position of the jet flow inlet holes, with a spacing formed therebetween. The equipment has the disadvantages of large flow resistance and small throughput, and actual requirements in large throughput conditions are difficult to meet thereby.

Currently, there are few hydrodynamic cavitation in-situ chemical oxidation circulation well technical solutions, and remediation agents are generally injected directly into groundwater with low reaction efficiency. In-situ chemical oxidation circulation well technology coupled with hydrodynamic cavitation technology will effectively improve the ability of an oxidant to contact contaminants and enhance the activation ability of the oxidant, thereby efficiently and continuously remediating organically contaminated groundwater. However, there are still some problems in the combined application of hydrodynamic cavitation technology and in-situ chemical oxidation circulation well technology, such as inconvenient regulation of hydrodynamic cavitation pressure, slow breakage of hydrodynamic cavitation bubbles, and a small throughput of hydrodynamic cavitation. Therefore, the present invention aims to solve the above technical problems and provides a circulation well system applied to in-situ remediation of organically contaminated groundwater.

In addition, on the one hand, due to differences in understanding of those skilled in the art; on the other hand, due to the fact that the inventor studied a large amount of literature and patents when making the present invention (however, because of limited space, did not list all details and contents in detail), it does not mean that the present invention does not have the features of the prior art; on the contrary, the present invention already has all the features of the prior art, and the applicant reserves the right to add relevant prior art to the background art.

SUMMARY OF THE INVENTION

In view of at least some of the drawbacks of the prior art, the present invention provides a groundwater circulation well system with pressure-adjustable hydrodynamic cavitation, the system including a hydrodynamic cavitator which is suspended in a circulation well and produces a hydrodynamic cavitation effect for groundwater under different operating conditions, wherein under the condition that contaminated groundwater flows through the hydrodynamic cavitator, the hydrodynamic cavitator is provided with a vortex chamber and a negative pressure chamber in a flow direction of the groundwater such that hydrodynamic cavitation bubbles generated in the vortex chamber by the contaminated groundwater are capable of collectively breaking in the negative pressure chamber based on a sudden pressure change, energy from collapsing and bursting of the hydrodynamic cavitation bubbles being capable of activating a remediation agent to effectively degrade organic contaminants in the groundwater.

The contaminated groundwater generates the hydrodynamic cavitation bubbles in the vortex chamber, based on a structure capable of generating flow conditions of a high flow velocity and low pressure intensity, and the hydrodynamic cavitation bubbles develop for certain time in a corresponding structure. The hydrodynamic cavitation bubbles collapse and burst after entering a high-pressure-intensity and low-flow-velocity region, and generate a high temperature and a high pressure at the instant of bursting. A hydrodynamic shear force generated by the instant high temperature and high pressure facilitates cleavage of carbon bonds in main chains of macromolecular organic compounds, and leads to "aqueous phase combustion" decomposition of organics at a gas-liquid phase junction of the hydrodynamic cavitation bubbles. At the same time, a large number of ions accumulate on gas-liquid interfaces of the collapsed hydrodynamic cavitation bubbles, such that active substances such as ·OH and $H_2O_2$ with high activity and good oxidation property can be produced, which directly oxidize dissolved or volatilized organic contaminants.

The collapse and burst of the hydrodynamic cavitation bubbles increases the specific surface area, such that organics in the groundwater diffuse to low concentration regions such as the interior of the hydrodynamic cavitation bubbles under the drive of a concentration difference, thus accelerating volatilization. The high temperature and high pressure and the active substances generated at the instant of bursting of the hydrodynamic cavitation bubbles can also overcome the drawback of low efficiency of oxidation reaction between the remediation agent and the organic contaminants due to low temperature and oxygen deficiency of the groundwater; the active substances such as ·OH and $H_2O_2$ with high activity and good oxidation property can further activate the remediation agent to strengthen its ability to oxidatively degrade the organic contaminants in the groundwater.

The hydrodynamic cavitator is provided, inside the vortex chamber, with a vortex water inlet column capable of changing a water passing aperture, in a manner that enables the contaminated groundwater to generate the hydrodynamic cavitation bubbles. In the case of changes in flow parameters of the groundwater flowing through the vortex chamber, the hydrodynamic cavitator is capable of changing a bubbling pressure and a breaking pressure of the hydrodynamic cavitation bubbles based on adjustment of the width and length of the aperture of the vortex water inlet column, wherein: the aperture is capable of changing a flow velocity of groundwater in the aperture based on adjusting the cross-sectional size of the aperture, to form the bubbling pressure adapted to flow conditions of groundwater at a current remediation stage or point; and the aperture is capable of controlling growth time of the hydrodynamic cavitation bubbles based on changing a flow distance of the hydrodynamic cavitation bubbles in the aperture, to adjust the breaking pressure to be adapted to the flow conditions of groundwater at the current remediation stage or point, such that the hydrodynamic cavitator is capable of controlling the number of the hydrodynamic cavitation bubbles generated, growth time and breaking timing thereof, based on the bubbling pressure and the breaking pressure which are adjustable.

In practice, for changing operating conditions for the treatment of organic contaminants in groundwater, main factors that influence the generation, development and disappearance of cavitation in flowing liquid and related flow characteristics include flow boundary geometry, an absolute pressure, a flow velocity, and a critical pressure for the formation of bubbles or the maintenance of cavities. In addition, water flow viscosity, surface tension, vaporization characteristics, impurities in water, boundary surface conditions and a pressure gradient, etc. also have influences to some degree. The most basic variables involved are pressure and flow rate. A parameter hydrodynamic cavitation effect with cavitation characteristics is generally established based on the two variables, and mainly characterized by a cavitation number $C_V$. $C_V=(P_0-P_V)/(0.5*\rho*V_0^2)$, where $P_0$ is a recovery pressure, $P_V$ is a saturated vapor pressure of the liquid at a corresponding temperature, $\rho$ is density of the liquid, and $V_0$ is an average flow velocity of the liquid in the aperture. The smaller the cavitation number $C_V$, the more intense the cavitation phenomenon is represented. For example, different organic contaminants can result in different densities, viscosities and hydrodynamic parameters of the groundwater; seasonal changes can cause changes in temperature of the groundwater, which in turn influence the density and the saturated vapor pressure of the groundwater; and operating parameters of a water suction and injection pump can also influence a groundwater flow velocity, etc. Therefore, an adjustable hydrodynamic cavitator is of great significance for the application of a hydrodynamic cavitation circulation well system in changing operating conditions.

The system of the present invention can adapt to different hydrodynamic conditions by adjusting the aperture. For example, when the groundwater flow treated by the system increases, the vacuum degree upstream of the water suction and injection pump increases, i.e., the recovery pressure in the negative pressure chamber decreases, and under the condition of an unchanging temperature of the groundwater passing through the aperture, the saturated vapor pressure and the density of the groundwater at the corresponding temperature remain basically unchanged, and the average flow velocity of the groundwater flowing through the aperture increases, and the hydrodynamic cavitation number changes. Therefore, reducing the average flow velocity of the groundwater flowing through the aperture by increasing the cross-sectional size of the aperture of the vortex water inlet column allows adjustment of the groundwater treatment volume under the precondition of not reducing the hydrodynamic cavitation effect; by extending/shortening the length of the aperture, the development time of the hydrodynamic cavitation bubbles inside the aperture increases/decreases and the pressure of the hydrodynamic cavitation bubbles is closer to/farther from the current saturated vapor pressure at the temperature, thus decreasing/increasing the difference between the internal pressure of the hydrodynamic cavitation bubbles and the pressure inside the negative pressure chamber while increasing/decreasing the volume of the hydrodynamic cavitation bubbles; and by providing apertures of different lengths according to flow conditions, the growth time and the breaking pressure of the cavitation bubbles can be adjusted. Furthermore, for changes in the saturated vapor pressure and the density of the groundwater, the cross-sectional size and the length of the aperture of the vortex water inlet column can also be adjusted to ensure the hydrodynamic cavitation effect.

Preferably, the hydrodynamic cavitator of the present invention can be configured with the apertures of different optimized sizes to enhance the overall cavitation effect. A plurality of groups of hydrodynamic cavitators are arranged in parallel in the circulation well according to the sizes of the hydrodynamic cavitators, and each single hydrodynamic cavitator is provided with a plurality of vortex water inlet columns arranged in its vortex chamber according to a rate of flow to be treated. Due to vortex and position differences within the vortex chamber, the vortex water inlet columns arranged at different positions are subject to different flow conditions, and thus the optimal sizes of the apertures of the vortex water inlet columns under typical conditions can be calculated by theoretical derivation and numerical simulation, etc. The hydrodynamic cavitator is configured in such a manner that the plurality of vortex water inlet columns arranged at different radial positions in the vortex chamber are configured with the apertures of different optimized sizes, which can improve the overall hydrodynamic cavitation effect of the hydrodynamic cavitator, such that the vortex water inlet columns of the hydrodynamic cavitator are not only adjustable as a whole but also adjustable locally. For example, the cross sections of the apertures of vortex water inlet columns arranged near edges of the vortex chamber are adjusted to a smaller size, so that in the case the flow velocity of the groundwater at the edges of the vortex chamber is lower than the flow velocity of the groundwater at the center of the vortex chamber, the vortex water inlet columns can prevent the hydrodynamic cavitation number from increasing, thus ensuring a good hydrodynamic cavitation effect.

Preferably, under the condition that the contaminated groundwater is capable of generating the hydrodynamic cavitation bubbles based on the hydrodynamic cavitator, the hydrodynamic cavitator is provided with a plurality of rotating mechanisms of different sizes for generating vortices in the vortex chamber such that the groundwater entering the vortex chamber, disturbed by the rotating mechanisms, generates vortices of different sizes to accelerate uniform mixing of an oxidizing agent with organic contaminants in the groundwater; and the plurality of rotating mechanisms of different sizes arranged at water inlet front ends of the vortex water inlet columns are configured to generate low-pressure vortex cores capable of increasing the number of the hydrodynamic cavitation bubbles generated.

The existing in-situ chemical oxidation circulation well technology has the shortcomings of inadequate contact between a remediation agent and contaminants, repeated dosing, and a poor agent activation effect, due to direct injection of the agent. The remediation agent is directly put into an aquifer through a plurality of agent dosing ports or put into different aquifers respectively, and the agent is driven by a concentration gradient to diffuse, contacts and reacts with organic contaminants, which has problems such as slow diffusion of the agent, a locally high concentration of the agent and repeated dosing. The dosed agent relies on its reaction with groundwater to release active substances such as free radicals, and there is a lack of agent activation methods by light, heat, catalysts or the like suitable for the groundwater environment. In the present invention, by providing the rotating mechanisms of different sizes, rotating vortices are formed in the circularly flowing groundwater, and the dosed remediation agent can be fully mixed with the organic contaminants in the groundwater under the agitating effect of the rotating vortices, and further oxidatively degrade the organic contaminants in the groundwater under the hydrodynamic cavitation effect. The rotating vortices can also remove sludge or impurities attached to the surfaces of components such as inner walls of the vortex chamber wall, the rotating mechanisms and the vortex water inlet columns by scouring and oscillating the components, thus improving the maintenance cycle and service life of the system.

Preferably, in the case the vortex water inlet columns for generating the hydrodynamic cavitation bubbles are arranged at an outlet at a tail end of the vortex chamber, outlets at tail ends of the vortex water inlet columns are connected to an inlet end of the negative pressure chamber such that the hydrodynamic cavitation bubbles generated by passing through the vortex water inlet columns are capable of directly entering the negative pressure chamber; and the hydrodynamic cavitation bubbles break and burst under the effect of a sudden pressure change, and energy generated from bursting is transferred to adjacent hydrodynamic cavitation bubbles to accelerate the process of collective breaking of the hydrodynamic cavitation bubbles. The hydrodynamic cavitation bubbles as a whole entering into the negative pressure chamber and collectively bursting can, based on a scale effect and a chain reaction, significantly expand high temperature and high pressure regions generated due to the bursting of the hydrodynamic cavitation bubbles, such that highly oxidizing and highly active substances generated by the bursting of the hydrodynamic cavitation bubbles spread in the negative pressure chamber, which further improves the oxidization capacity of the remediation agent and increases regions where oxidation reactions occur.

Preferably, in the case where part of the hydrodynamic cavitation bubbles can flow with the groundwater to a tail end of the negative pressure chamber, bubble puncturing needles arranged at a water outlet at the tail end of the negative pressure chamber are capable of puncturing the hydrodynamic cavitation bubbles which flow from the vortex water inlet columns into the negative pressure chamber and do not break by itself under a sudden pressure change to avoid affecting the working performance of the water suction and injection pump by the hydrodynamic cavitation bubbles.

Preferably, large rotating blades for generating a large-size vortex are provided on an agitation rotating shaft arranged coaxially with the vortex chamber and the negative pressure chamber, the agitation rotating shaft being connected to a vortex chamber base arranged at the tail end of the vortex chamber and to a negative pressure chamber base arranged at the tail end of the negative pressure chamber, respectively, in a manner capable of maintaining the position and height of the hydrodynamic cavitator. Small rotating blades for generating small-size vortices are arranged at the front ends of the vortex water inlet columns and connected to the vortex water inlet columns by means of blade fixing rods. Graded agitation by the rotating blades of different sizes generates a large number of low-pressure vortex cores while facilitating uniform mixing of the remediation agent and the organic contaminants in the groundwater, thus increasing the efficiency of generating the hydrodynamic cavitation bubbles and the number of the hydrodynamic cavitation bubbles generated.

Preferably, the system further includes a circulation well body for forming a vertical three-dimensional flow cycle, the circulation well body including an upper screen pipe, a packer, and a lower screen pipe, the internal space of the circulation well body being separated into an upper screen pipe segment and a lower screen pipe segment by the packer. The groundwater treated by the hydrodynamic cavitator enters a sucked and injected water circulation assembly based on a negative pressure generated by a water suction and injection pump and is conveyed to the lower screen pipe segment, and the groundwater in the lower screen pipe segment flows under pressure through the lower screen pipe to the outside of the circulation well body, and the groundwater outside the circulation well body enters the upper screen pipe segment through the upper screen pipe to replenish the upper screen pipe segment for the reduced groundwater, thus forming the vertical three-dimensional flow cycle.

Preferably, in the case the hydrodynamic cavitator is arranged at a position in the upper screen pipe segment above the upper screen pipe, the groundwater horizontally entering the upper screen pipe segment from the upper screen pipe can flow through the hydrodynamic cavitator in a vertically upward flow manner, such that the groundwater forms a vortex in a rising stage to reduce impact turbulence and flow resistance.

Preferably, the system further includes a ground treatment station for treating gaseous contaminants, the ground treatment station being connected via a pipe to a gas collection hood arranged above a liquid level of the groundwater in the circulation well, such that the gas collection hood is capable of collecting volatile organic contaminants generated in the circulation well and conveying the volatile organic contaminants to the ground treatment station for purification, based on a gas suction pump provided between the ground treatment station and the gas collection hood.

Preferably, the system further includes a remediation agent storage tank arranged on the ground, the remediation agent storage tank being capable of conveying a remediation agent to an agent injection tube under the action of an agent injection pump, the agent injection tube being arranged in the agitation rotating shaft and releasing the remediation agent into the vortex chamber. The remediation agent is agitated by the large rotating blades and the small rotating blades in the vortex chamber, such that the evenly agitated remediation agent contacts and reacts with more organic contaminants, which reduces the probability of repeated dosing.

The present invention also provides hydrodynamic cavitator, which includes a vortex chamber for generating vortices and hydrodynamic cavitation bubbles, wherein in the case of changes in flow conditions of groundwater flowing through the hydrodynamic cavitator, the vortex chamber is provided with a vortex water inlet column which has a water passing aperture with an adjustable length and width, in such a manner that the groundwater with different flow conditions is capable of undergoing an adjustable hydrodynamic cavitation effect in the vortex chamber, such that the hydrodynamic cavitator is capable of adjusting a bubbling pressure and a breaking pressure of the hydrodynamic cavitation bubbles based on the vortex water inlet column which has the water passing aperture with an adjustable length and width, to control the number of the hydrodynamic cavitation bubbles generated, and growth time and breaking timing thereof.

In the case the vortex water inlet column for generating the hydrodynamic cavitation bubbles is arranged at an outlet at a tail end of the vortex chamber, an outlet at a tail end of the vortex water inlet column is connected to an inlet end of the negative pressure chamber such that the hydrodynamic cavitation bubbles generated by passing through the vortex water inlet column are capable of directly entering the negative pressure chamber; and the hydrodynamic cavitation bubbles break and burst under the effect of a sudden pressure change, and energy generated from bursting is transferred to adjacent hydrodynamic cavitation bubbles to accelerate the process of collective breaking of the hydrodynamic cavitation bubbles.

Preferably, the vortex water inlet column for generating the hydrodynamic cavitation bubbles is provided with an aperture for groundwater to pass through, and in the case of different flow conditions of groundwater, the aperture is capable of changing a flow velocity of groundwater in the aperture based on adjusting the cross-sectional size of the aperture, to form the bubbling pressure adapted to flow conditions of groundwater at a current remediation stage or point; and the aperture is capable of controlling growth time of the hydrodynamic cavitation bubbles based on changing a flow distance of the hydrodynamic cavitation bubbles in the aperture, to adjust the breaking pressure to be adapted to the flow conditions of groundwater at the current remediation stage or point, such that the hydrodynamic cavitator can adapt to contaminated groundwater with different physical properties at different remediation points at a same site, and contaminated groundwater with changing physical properties at different remediation stages at a same point.

Preferably, one or more axial magnetic attached sheets arranged axially along the vortex water inlet column are attached on a side wall of the aperture, and the aperture is configured to change the width of the aperture by increasing or reducing the number of the axial magnetic attached sheets to adjust the bubbling pressure of the groundwater.

Preferably, one or more transverse magnetic attached sheets having the same diameter as the vortex water inlet column are attached on a tail end of the vortex water inlet column, and the aperture is configured to change the length of the aperture by increasing or reducing the number of the transverse magnetic attached sheets to adjust the breaking pressure of the hydrodynamic cavitation bubbles in the negative pressure chamber.

Preferably, under the condition that the contaminated groundwater is capable of generating the hydrodynamic cavitation bubbles based on the hydrodynamic cavitator, the hydrodynamic cavitator is provided with a plurality of rotating mechanisms of different sizes for generating vortices in the vortex chamber such that the groundwater entering the vortex chamber, disturbed by the rotating mechanisms, generates vortices of different sizes to accelerate uniform mixing of an oxidizing agent with organic contaminants in the groundwater; and the plurality of rotating mechanisms of different sizes arranged at water inlet front ends of the vortex water inlet columns are configured to generate low-pressure vortex cores capable of increasing the number of the hydrodynamic cavitation bubbles generated.

Preferably, in the case where a plurality of vortex water inlet columns are densely distributed in parallel on the vortex chamber base, the distance between adjacent vortex water inlet columns is set in such a manner that each vortex water inlet column is capable of simultaneously producing a hydrodynamic cavitation effect to meet the demand for high-throughput groundwater treatment. The vortex water inlet columns can be arranged with equal spacings in such a manner that the flow conditions of the groundwater flowing through the vortex water inlet columns are same, such that the vortex water inlet columns more accurately control the bubbling pressure of the groundwater by changing the cross-sectional size of the aperture. Each vortex water inlet column is an independent hydrodynamic cavitation generating device, and the contaminated groundwater can produce hydrodynamic cavitation bubbles when passing through the vortex water inlet column. Due to the large number of the vortex water inlet columns, an additive effect is strong, and a total hydrodynamic cavitation throughput is large, which can meet a normal operation demand of a sucked and injected water circulation assembly of a circulation well.

Preferably, the tail ends of the vortex water inlet columns are connected to the negative pressure chamber, and at the tail end of the negative pressure chamber, bubble puncturing needles are provided, which are capable of puncturing the hydrodynamic cavitation bubbles which flow from the vortex water inlet columns into the negative pressure chamber and do not break by itself under a sudden pressure change; and the bubble puncturing needles are arranged on a negative pressure chamber base at intervals in such a manner that distances between adjacent bubble puncturing needles are less than the size of the hydrodynamic cavitation bubbles, such that the hydrodynamic cavitation bubbles flowing through the tail end of the negative pressure chamber break under the action of the bubble puncturing needles.

Preferably, the bubble puncturing needles can be arranged on the surface of a rotating bar, which is fixed to an agitation rotating shaft of the hydrodynamic cavitator. As the rotating bar and the bubble puncturing needle occupy little space, there is little retardance to the groundwater flowing through the bubble puncturing needles and the rotating bar.

Preferably, large rotating blades are provided inside the vortex chamber to generate a vortex for agitating a remediation agent, and small rotating blades are provided at inlet ends of the vortex water inlet columns to generate water inlet vortices. At both head or tail end regions of the large rotating blades and the small rotating blades, low-pressure vortex cores are liable to be formed to facilitate the generation of the hydrodynamic cavitation bubbles.

Preferably, the remediation agent is delivered in the vortex chamber; an agent injection tube is provided in the middle of agitation rotating shaft of the hydrodynamic cavitator; and the remediation agent enters the vortex chamber through the agent injection tube, and is agitated by the large rotating blades and the small rotating blades in the vortex chamber, such that the evenly agitated remediation agent contacts and reacts with more organic contaminants, which reduces the probability of repeated dosing.

Preferably, in the case the hydrodynamic cavitation bubbles collectively enter the negative pressure chamber and break and burst, a sound detector capable of detecting a breaking sound volume of the hydrodynamic cavitation bubbles in real time is mounted in the negative pressure chamber, such that the breaking sound volume of the hydrodynamic cavitation bubbles can be used as a basis for evaluating a hydrodynamic cavitation effect. The higher the volume, the more hydrodynamic cavitation bubbles break, the better the hydrodynamic cavitation effect, and the width and length of the apertures of the vortex water inlet columns are most appropriate.

The present invention has the following beneficial effects:
(1) A hydrodynamic cavitator that is pressure-adjustable and suitable for different flow conditions is coupled to in-situ chemical oxidation circulation well technology. Under the action of the hydrodynamic cavitator, the groundwater produces vortices, which accelerate uniform mixing of a remediation agent and contaminants in groundwater, and the pressure-adjustable hydrodynamic cavitator can optimize hydrodynamic cavitation effects in different spaces and times and improve the applicability of hydrodynamic cavitation circulation well in-situ remediation technology.
(2) In the hydrodynamic cavitator, a bubbling pressure and a breaking pressure of hydrodynamic cavitation bubbles are adjusted by changing the width and length of a water passing aperture through a vortex water inlet column, such that a high temperature and a high pressure is generated at the instant of collapse and burst of the hydrodynamic cavitation bubbles, which can facilitate "aqueous phase combustion" of organics and activation of the remediation agent, and active substances such as $\cdot OH$ and $H_2O_2$ are produced, which can continuously and efficiently remove organic contaminants in the groundwater.
(3) The vortex water inlet column is arranged at a tail end of a vortex chamber such that the hydrodynamic cavitation bubbles formed at the tail end of the vortex chamber can enter a negative pressure chamber as a whole, rapidly break and collectively burst, and the burst hydrodynamic cavitation bubbles generate an instantaneous high temperature and high pressure, which can provide energy for breaking of adjacent hydrodynamic cavitation bubbles.
(4) Each vortex water inlet column is an independent hydrodynamic cavitation generating device, and the contaminated groundwater can produce hydrodynamic cavitation bubbles when passing through the vortex water inlet column. The vortex water inlet columns can be densely distributed in parallel on the vortex chamber base, resulting in a strong additive effect and a large total hydrodynamic cavitation throughput, which can meet a normal operation demand of a sucked and injected water circulation assembly of a circulation well.

LIST OF REFERENCE SIGNS

1: surface treatment station; 2: gas suction pump; 3: remediation agent storage tank; 4: agent injection pump; 5: water suction and injection pump; 6: sucked and injected water circulation assembly; 7: gas collection hood; 8: bubble puncturing needle; 9: agent injection tube; 10: transverse magnetic attached sheet; 11: agitation rotating shaft; 12: negative pressure chamber; 13: vortex chamber base; 14: axial magnetic attached sheet; 15: vortex water inlet column 16: small rotating blade; 17: hydrodynamic cavitator; 18: vortex chamber; 19: upper screen pipe segment; 20: large rotating blade; 21: upper screen pipe; 22: circulation well body; 23: packer; 24: lower screen pipe segment; 25: lower screen pipe; 26: sound detector; 27: vortex water inlet column thread; 28: blade fixing rod.

DETAILED DESCRIPTION

Detailed description is provided below in conjunction with the drawings of the description.

The present invention provides a circulation well system with pressure-adjustable hydrodynamic cavitation (referred to as a system in the following specific embodiments), which has good prospects for application in the field of groundwater contamination treatment. The system couples a hydrodynamic cavitator that is pressure-adjustable and suitable for different flow conditions to in-situ chemical oxidation circulation well technology, such that organic contaminants in groundwater can be treated continuously and effectively.

Embodiment 1

Figure 1:
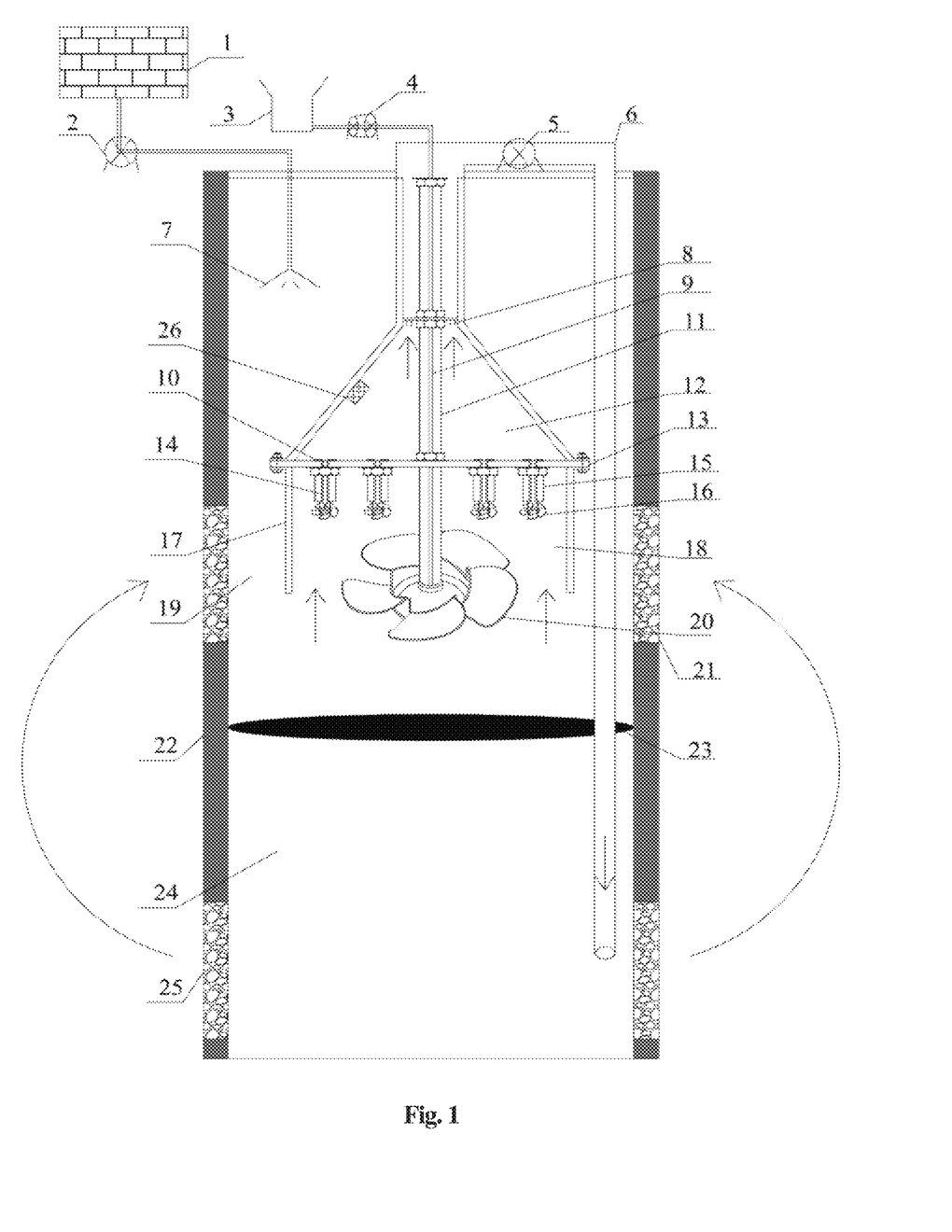
FIG. 1 is a simplified structural diagram of a preferred implementation of a groundwater circulation well system with pressure-adjustable hydrodynamic cavitation of the present invention.

As shown in FIG. 1, the system includes a hydrodynamic cavitator 17 for producing a hydrodynamic cavitation effect for contaminated groundwater. The hydrodynamic cavitator 17 is placed inside a circulation well body 22. The circulation well body 22 includes an upper screen pipe 21, a packer 23, and a lower screen pipe 25. The internal space of the circulation well body 22 is separated into an upper screen pipe segment 19 and a lower screen pipe segment 24 by the packer 23. As indicated by arrows illustrating a flow direction of groundwater in FIG. 1, the groundwater treated by the hydrodynamic cavitator 17 enters a sucked and injected water circulation assembly 6 based on a negative pressure generated by a water suction and injection pump 5 and is conveyed to the lower screen pipe segment 24, and the groundwater in the lower screen pipe segment 24 flows under pressure through the lower screen pipe 25 to the outside of the circulation well body 22, and the groundwater outside the circulation well body 22 enters the upper screen pipe segment 19 through the upper screen pipe 21 to replenish the upper screen pipe segment 19 for the reduced groundwater, thus forming a vertical three-dimensional flow cycle.

Preferably, the contaminated groundwater flows through the vortex chamber 18 and the negative pressure chamber 12 of the hydrodynamic cavitator 17 successively based on a flow cycle. Large rotating blades 20 for generating a large-size vortex are provided on an agitation rotating shaft 11 arranged coaxially with the vortex chamber 18 and the negative pressure chamber 12. The agitation rotating shaft 11 is connected to a vortex chamber base arranged at a tail end of the vortex chamber 18 and to a negative pressure chamber base arranged at a tail end of the negative pressure chamber 12 respectively in a manner capable of maintaining the position and height of the hydrodynamic cavitator 17. Small rotating blades 16 for generating small-size vortices are arranged at front ends of vortex water inlet columns 15. The small rotating blades 16 can be thin straight cornered, thick curved cornered, thin curved cornered, or otherwise irregularly shaped. The large rotating blades 20 and the small rotating blades 16 can generate vortices of different sizes to accelerate uniform mixing of a remediation agent with organic contaminants in the groundwater.

Preferably, in the case the hydrodynamic cavitator 17 is arranged at a position in the upper screen pipe segment 19 above the upper screen pipe 21, the groundwater horizontally entering the upper screen pipe segment 19 from the upper screen pipe 21 can flow through the hydrodynamic cavitator 17 in a vertically upward flow manner, such that the groundwater forms a vortex in a rising stage to reduce impact turbulence and flow resistance. The hydrodynamic cavitator 17 is designed as a detachable structure. Dimensions of the hydrodynamic cavitator 17 can be designed according to dimensions of the circulation well. The number of sets of hydrodynamic cavitators arranged can be increased or decreased according to actual needs, and a plurality of sets of hydrodynamic cavitators 17 can be arranged in parallel inside the circulation well body 22.

Preferably, the hydrodynamic cavitator 17 of the present invention can be provided in the upper screen pipe segment 19 of the circulation well body 22, and can also be provided in the lower screen pipe segment 24 of the circulation well body 22, to meet hydrodynamic cavitation demands of different water suction and injection modes such as an upper suction and lower injection mode or a lower suction and upper injection mode.

Preferably, the vortex water inlet columns 15 are arranged at the tail end of the vortex chamber 18 such that hydrodynamic cavitation bubbles generated by the groundwater flowing through the vortex water inlet columns 15 can collectively enter the negative pressure chamber 12 and collectively break based on a sudden pressure change. The large rotating blades 20 and small rotating blades 16 are arranged at the water inlet front ends of the vortex water inlet columns, and blade edges of the large rotating blades 20 and the small rotating blades 16 can generate low-pressure vortex cores to increase the number of hydrodynamic cavitation bubbles generated.

Preferably, at the tail end of the vortex chamber 18, a vortex chamber base 13 is arranged in a such manner that the vortex chamber 18 can be separated from the negative pressure chamber 12, and a plurality of vortex water inlet columns 15 are arranged in parallel at intervals on a side of the vortex chamber base 13 close to the vortex chamber 18. The distance between adjacent vortex water inlet columns 15 is set in such a manner that each vortex water inlet column 15 is capable of simultaneously producing a hydrodynamic cavitation effect, such that the plurality of vortex water inlet columns 15 densely distributed in parallel on the surface of the vortex chamber base 13 can meet the demand for high-throughput groundwater treatment. The hydrodynamic cavitator 17 can be provided with different numbers of vortex water inlet columns 15 arranged in the vortex chamber base 13 according to a rate of flow to be treated. Each vortex water inlet column 15 is an independent hydrodynamic cavitation generating device, and the contaminated groundwater can produce hydrodynamic cavitation bubbles when passing through the vortex water inlet column 15. Due to the large number of the vortex water inlet columns 15, an additive effect is strong, and a total hydrodynamic cavitation throughput is large, which can meet a normal operation demand of the sucked and injected water circulation assembly 6 of the circulation well. The arrangement of the vortex water inlet columns 15 on the plane of the vortex chamber base 13 can be in the form of lines and rows, or staggered on alternate lines, or in other arrangement forms.

Preferably, bubble puncturing needles 8 are provided at the tail end of the negative pressure chamber 12, and the bubble puncturing needles 8 are capable of puncturing the hydrodynamic cavitation bubbles which flow from the vortex water inlet columns 15 into the negative pressure chamber 12 and do not break by itself under a sudden pressure change.

Preferably, the system further includes a ground treatment station 1 for treating gaseous contaminants. The ground treatment station 1 is connected via a pipe to a gas collection hood 7 arranged above a liquid level of the groundwater in the circulation well body 22, such that the gas collection hood 7 is capable of collecting volatile organic contaminants generated in the circulation well body 22 and conveying the volatile organic contaminants to the ground treatment station 1 for purification, based on a gas suction pump 2 provided between the ground treatment station 1 and the gas collection hood 7.

Preferably, the system further includes a remediation agent storage tank 3 arranged on the ground. The remediation agent storage tank 3 is capable of conveying a remediation agent to an agent injection tube 9 under the action of an agent injection pump 4. The agent injection tube 9 releases the remediation agent into the vortex chamber 18. The remediation agent is an oxidizing agent capable of oxidizing the organic contaminants in the groundwater, such as hydrogen peroxide, persulfate, permanganate, Fenton's reagent, or the like.

Figure 2:
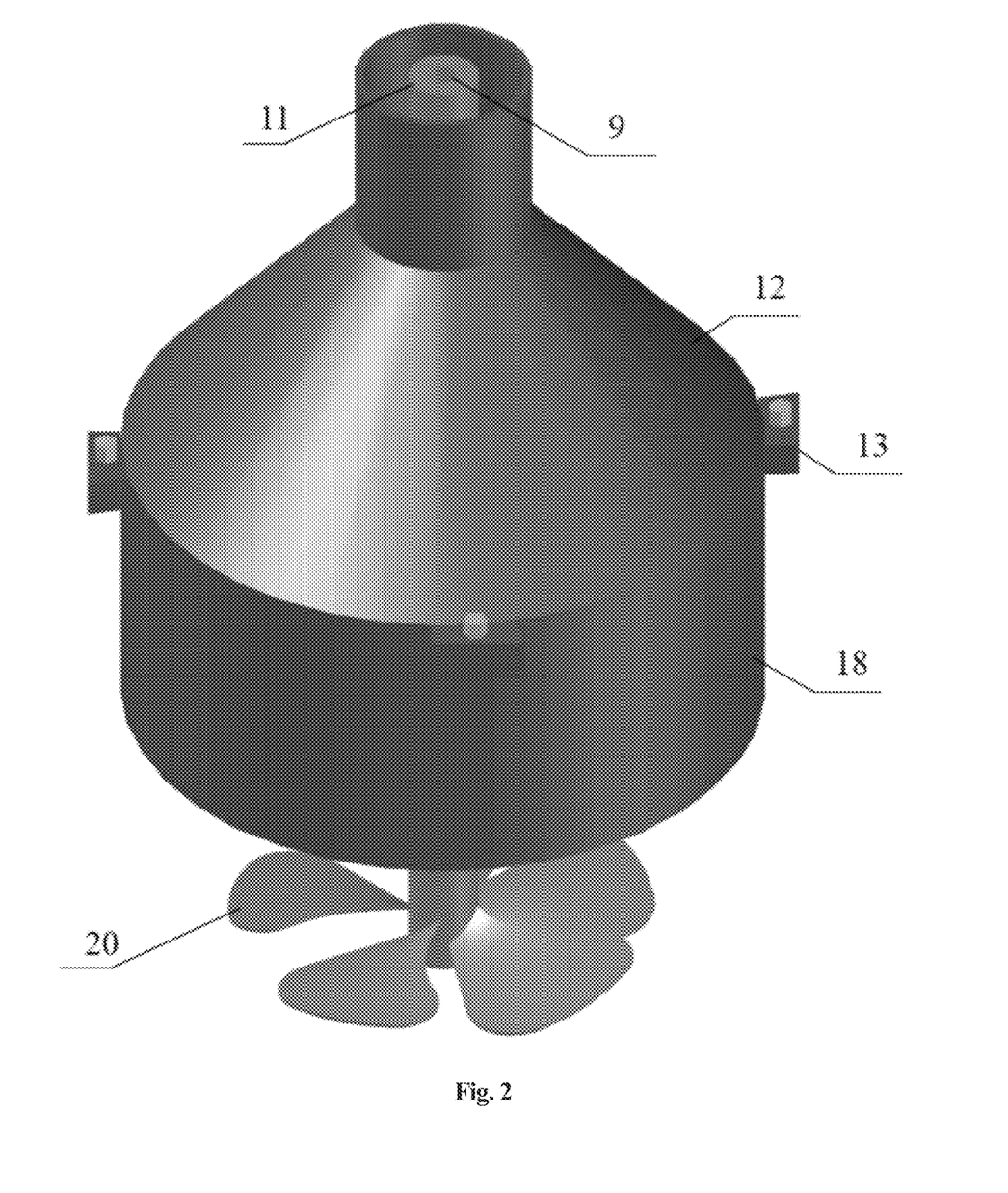
FIG. 2 is a simplified structural diagram of a preferred implementation of a hydrodynamic cavitator of the present invention.

Preferably, as shown in FIG. 2, the large rotating blades 20 are provided at a water inlet front end of the vortex chamber 18 and connected to the agitation rotating shaft 11, and the vortex chamber 18 and the negative pressure chamber 12 are arranged coaxially with the agitation rotating shaft 11, and the vortex chamber base 13 is arranged at the tail end of the vortex chamber 18 and connected to a front end of the negative pressure chamber 12; the agent injection tube 9 is arranged inside the agitation rotating shaft 11, and the remediation agent injected through the agent injection tube 9 is agitated by the large rotating blades 20 and the small rotating blades 16 in the vortex chamber 18, such that the evenly agitated remediation agent contacts and reacts with more organic contaminants, which can reduce the probability of repeated dosing.

Figure 3:
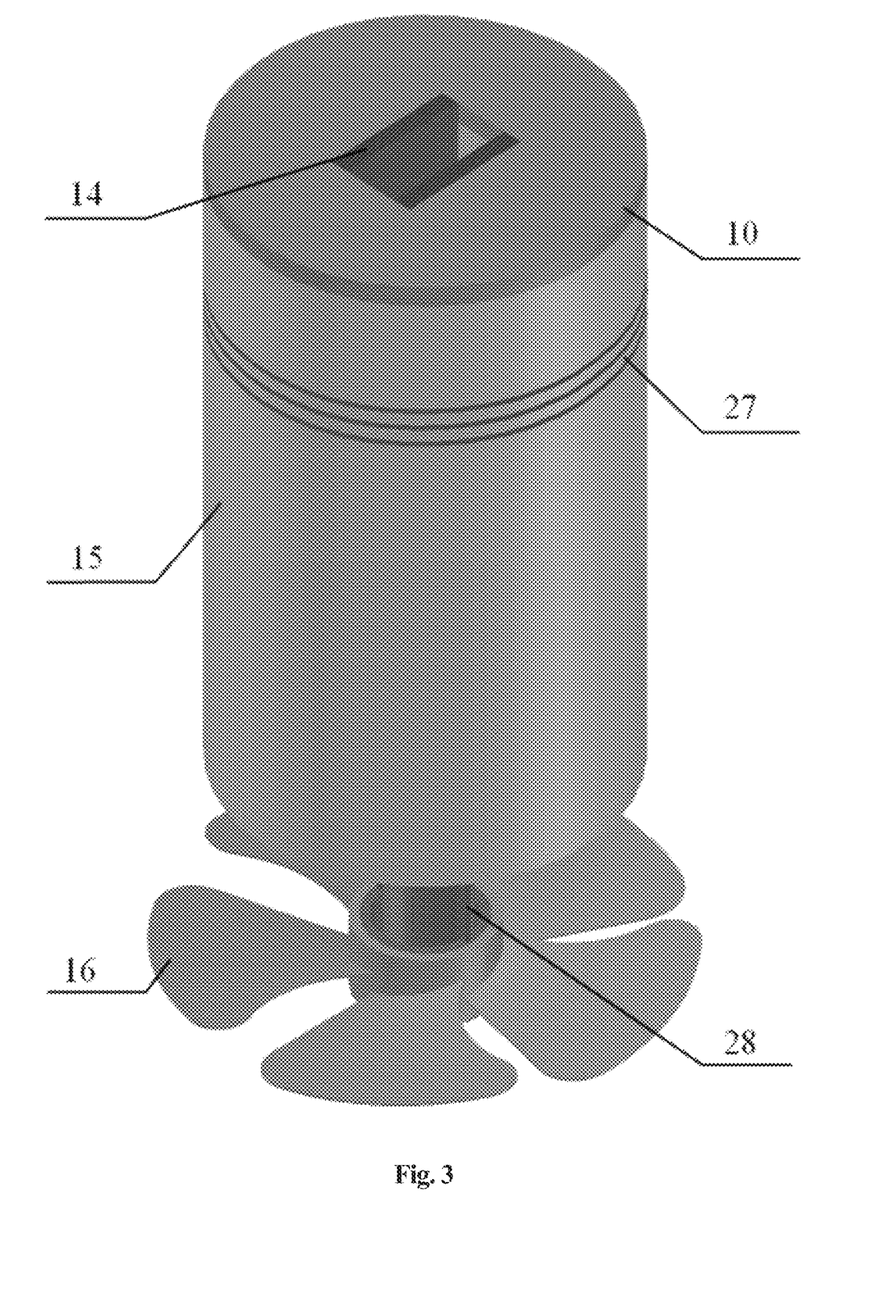
FIG. 3 is a simplified structural diagram of a preferred implementation of a vortex water inlet column of the present invention.
Figure 4:
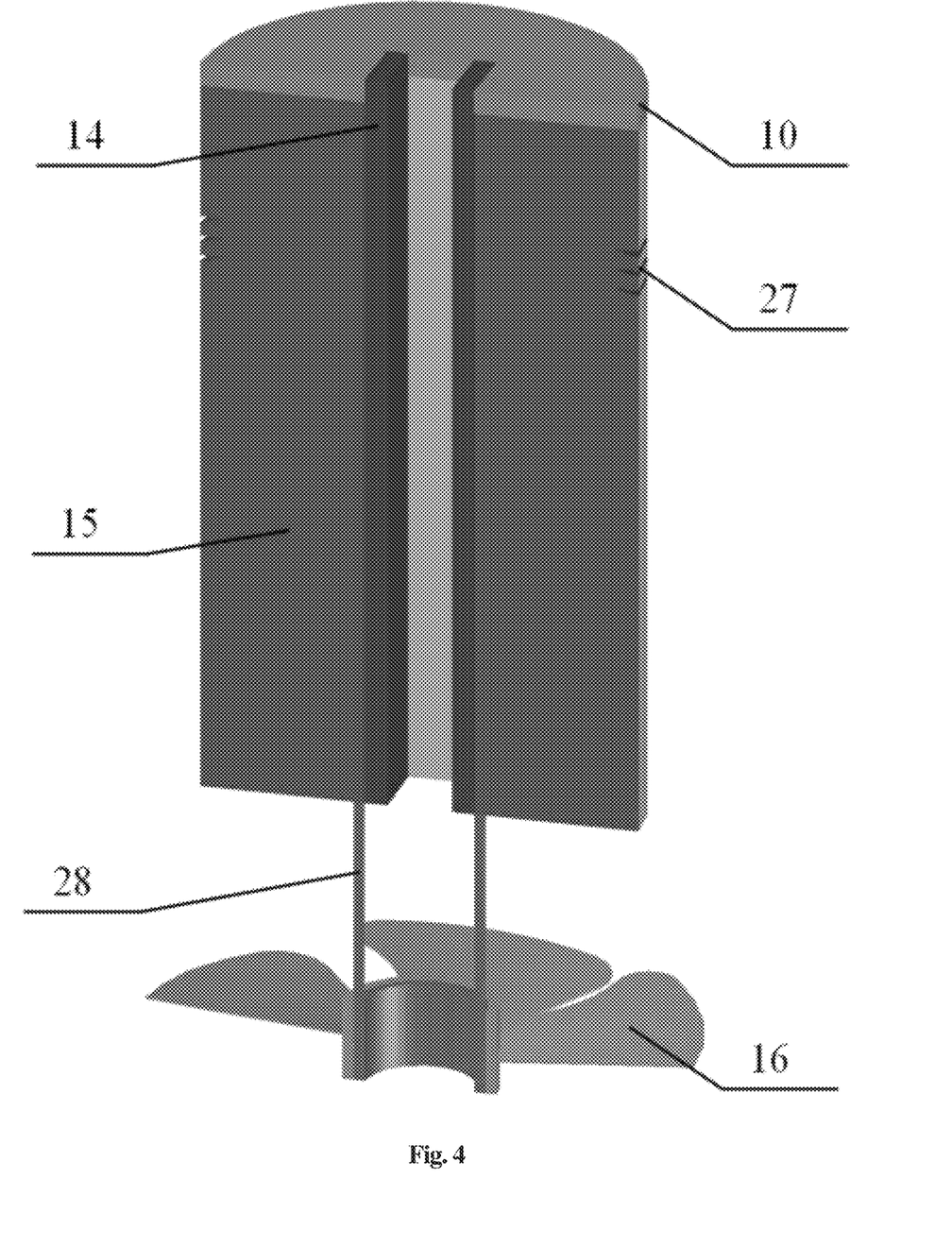
FIG. 4 is a cross-sectional structural diagram of a preferred implementation of a vortex water inlet column of the present invention.

Preferably, as shown in FIGS. 3 and 4, the vortex water inlet column 15 is provided with an aperture that allows groundwater to pass through, and one or more axial magnetic attached sheets 14 are mounted on a side wall of the aperture, and one or more transverse magnetic attached sheets 10 are mounted at an end of the vortex water inlet column 15 close to the negative pressure chamber 12; the small rotating blades 16 are arranged at the front end of the vortex water inlet column 15 and connected to the vortex water inlet column 15 by means of a blade fixing rod 28, and the vortex water inlet column 15 is provided, on a side close to the negative pressure chamber 12, with a vortex water inlet column thread 27, by means of which the vortex water inlet column 15 can be detachably connected to the vortex chamber base 13, and the number of vortex water inlet columns 15 mounted on the vortex chamber base 13 can be selected autonomously as needed to adapt to the volume of groundwater to be treated.

Embodiment 2

This embodiment is further illustration of the hydrodynamic cavitator 17, and same parts as in Embodiment 1 will not be repeated. The hydrodynamic cavitator 17 includes a vortex chamber 18 for generating vortices and hydrodynamic cavitation bubbles, wherein in the case of changes in flow conditions of groundwater flowing through the hydrodynamic cavitator 17, the vortex chamber 18 is provided with a vortex water inlet column 15 which has a water passing aperture with an adjustable length and width, in such a manner that the groundwater with different flow conditions is capable of undergoing an adjustable hydrodynamic cavitation effect in the vortex chamber 18, such that the hydrodynamic cavitator 17 is capable of adjusting a bubbling pressure and a breaking pressure of the hydrodynamic cavitation bubbles based on the vortex water inlet column 15 which has the water passing aperture with an adjustable length and width, to control the number of the hydrodynamic cavitation bubbles generated, and growth time and breaking timing thereof.

Preferably, the vortex water inlet columns 15 for generating the hydrodynamic cavitation bubbles are arranged at an outlet at a tail end of the vortex chamber 18, and tail ends of the vortex water inlet columns 15 are connected to an inlet end of the negative pressure chamber 12 such that the hydrodynamic cavitation bubbles generated by passing through the vortex water inlet columns 15 can directly enter the negative pressure chamber 12. The hydrodynamic cavitation bubbles entering the negative pressure chamber 12 break and burst under the effect of a sudden pressure change, and energy generated from bursting can be transferred to adjacent hydrodynamic cavitation bubbles to accelerate the process of collective breaking.

Preferably, in the case the groundwater is in different flow conditions, the apertures can change a flow velocity of groundwater in the apertures based on adjusting the cross-sectional size of the apertures, to form the bubbling pressure adapted to flow conditions of groundwater at a current remediation stage or point; and the apertures can control growth time of the hydrodynamic cavitation bubbles based on changing a flow distance of the hydrodynamic cavitation bubbles in the apertures, to adjust the breaking pressure to be adapted to the current flow conditions of groundwater, such that the hydrodynamic cavitator 17 can adapt to contaminated groundwater with different physical properties at different remediation points at a same site, and contaminated groundwater with changing physical properties at different remediation stages at a same point.

Preferably, one or more axial magnetic attached sheets 14 arranged axially along the vortex water inlet column 15 are attached on a side wall of the aperture of the vortex water inlet column 15, and the aperture is configured to change the width of the aperture by increasing or reducing the number of the axial magnetic attached sheets 14 to adjust the bubbling pressure of the groundwater under different operating conditions; one or more transverse magnetic attached sheets 10 having the same diameter as the vortex water inlet column 15 are attached on a tail end of the vortex water inlet column 15, and the aperture is configured to change the length of the aperture by increasing or reducing the number of the transverse magnetic attached sheets 10 to adjust the breaking pressure of the hydrodynamic cavitation bubbles in the negative pressure chamber 12.

Preferably, in the case a plurality of vortex water inlet columns 15 are densely distributed in parallel on the vortex chamber base 13, the vortex water inlet columns 15 can be arranged with equal spacings in such a manner that the flow conditions of the groundwater flowing through the vortex water inlet columns 15 are same, such that the vortex water inlet columns 15 more accurately control the bubbling pressure of the groundwater by changing the cross-sectional size of the aperture.

Preferably, the tail ends of the vortex water inlet columns 15 are connected to the negative pressure chamber 12, and at the tail end of the negative pressure chamber 12, bubble puncturing needles 8 are provided, which are capable of puncturing the hydrodynamic cavitation bubbles which flow from the vortex water inlet columns 15 into the negative pressure chamber 12 and do not break by itself under a sudden pressure change; and the bubble puncturing needles 8 are arranged on a negative pressure chamber base at intervals in such a manner that spacings of adjacent bubble puncturing needles 8 are less than the size of the hydrodynamic cavitation bubbles, such that the hydrodynamic cavitation bubbles flowing through the tail end of the negative pressure chamber break under the action of the bubble puncturing needles to improve the breaking rate of the hydrodynamic cavitation bubbles.

Preferably, the bubble puncturing needles 8 can be arranged on the surface of a rotating bar, which is fixed to an agitation rotating shaft 11 of the hydrodynamic cavitator 17. As the rotating bar and the bubble puncturing needle 8 occupy little space, there is little retardance to the groundwater flowing through the bubble puncturing needles 8 and the rotating bar.

Preferably, in the case the hydrodynamic cavitation bubbles collectively enter the negative pressure chamber 12 and break and burst, a sound detector 26 capable of detecting a breaking sound volume of the hydrodynamic cavitation bubbles in real time is mounted in the negative pressure chamber 12, such that the breaking sound volume of the hydrodynamic cavitation bubbles can be used as a basis for evaluating a hydrodynamic cavitation effect. The higher the volume, the more hydrodynamic cavitation bubbles break, the better the hydrodynamic cavitation effect, and the width and length of the apertures of the vortex water inlet columns 15 best match the current flow conditions of the groundwater.

Preferably, the material of the vortex water inlet column 15 can be a magnetic material, which can be a ferrite, alloy or other magnetic material; and the shape of the vortex water inlet column 15 is not limited and can be circular, triangular, square, rectangular or other shape.

Preferably, the vortex water inlet column 15 is provided with an aperture of a certain width in the middle, and the number and shape of the aperture can be adjusted. The number of the aperture can be one or more, and the shape of the aperture is not limited to a cuboidal shape, but can be a cylindrical, cubic, polygonal columnar or irregular shape, etc.

An axial magnetic attached sheet 14 is attached on a side wall of the aperture of the vortex water inlet column 15, and by increasing or reducing the number of the axial magnetic attached sheet 14, the width of the aperture can be changed to form a water inlet pressure suitable for organically contaminated groundwater with different densities, viscosities, and other physical properties, thereby producing a good bubbling effect.

A transverse magnetic attached sheet 10 having the same diameter as the vortex water inlet column 15 is attached on a tail end of the vortex water inlet column 15, and by increasing or reducing the number of the transverse magnetic attached sheet 10, the length of the aperture can be changed to control the growth time of the hydrodynamic cavitation bubbles in the vortex water inlet column 15, i.e., the time for which the hydrodynamic cavitation bubbles flow through the vortex water inlet column 15, to adjust the breaking pressure of the hydrodynamic cavitation bubbles in the negative pressure chamber 12.

Preferably, the length of the vortex water inlet column 15 is not greater than 10 mm, which can provide formation and growth time of the hydrodynamic cavitation bubbles, but also can limit a vortex low pressure area to the tail end of the vortex water inlet column 15, such that the hydrodynamic cavitation bubbles are formed in a concentrated manner at the tail end, collectively enter the subsequent negative pressure chamber 12 and quickly break. High temperature and high pressure are generated at the instant of breakage of the hydrodynamic cavitation bubbles, and can provide breakage energy for adjacent hydrodynamic cavitation bubbles. Therefore, collective breakage of the hydrodynamic cavitation bubbles is more efficient and faster than individual breakage of the hydrodynamic cavitation bubbles.

Preferably, the outer diameter of the vortex water inlet columns 15 is not greater than 10 mm, and there is a distance of 5 mm between the vortex water inlet columns 15, such that the influence on adjacent vortex water inlet columns 15 is small. As shown in FIG. 3, a thread 27 is formed on an outer wall of the vortex water inlet column 15, which is fixed to the vortex chamber base 13 by means of a hexagonal screw, and thus is convenient for installation and detachment. For throughput increase/decrease adjustment, it only needs to increase/decrease the number of the vortex water inlet column 15, and throughput increase/decrease is relatively flexible.

As shown in FIG. 4, the thickness of the axial magnetic attached sheet 14 of the vortex water inlet column 15 is not fixed, and the thickness can be less than 1 mm or less than 0.5 mm. The smaller the thickness, the higher the adjustment precision. The thickness of the transverse magnetic attached sheet 10 of the vortex water inlet column 15 is also not fixed, and the thickness can be less than 1 mm or less than 0.5 mm. The smaller the thickness, the higher the adjustment precision.

Preferably, adjustment of the aperture of the vortex inlet column 15 in the axial direction can be implemented by designing a spring-type stretchable structure to change the size of the aperture in the axial direction; adjustment of the aperture in the longitudinal direction can be implemented by increasing or decreasing the thickness of a mounting base for the vortex inlet column 15, or adjusting the vortex inlet column 15 and the vortex chamber base 13 at the same time; for example, the vortex inlet column 15 can be prepared from an expandable and shrinkable material.

Preferably, the aperture of the vortex water inlet column 15 can be configured as a venturi tube, which is a flow channel that first narrows and then gradually widens. The groundwater carries a large number of low-pressure vortex cores after being agitated by the large rotating blades 20 and the small rotating blades 16, and flows in from an inlet segment of the venturi tube. Due to a reduced size of the flow channel, a dynamic pressure of the groundwater reaches the maximum and a static pressure thereof reaches the minimum at a throat position of the venturi tube. When the static pressure is less than a saturated vapor pressure of the groundwater at the current temperature, hydrodynamic cavitation bubbles are continuously generated. The length of an outlet segment of the venturi tube can limit the development time of the hydrodynamic cavitation bubbles, such that the hydrodynamic cavitation bubbles break after collectively entering the negative pressure chamber 12.

Preferably, the diameter of the venturi tube can be determined according to parameters such as groundwater temperature, density, organic contaminant type and content, and a plurality of sets of rapidly replaceable venturi tube assemblies are provided according to different seasons and different objects to be treated to improve the applicability of the vortex water inlet column 15 under different treatment conditions.

Preferably, the number of the aperture of each vortex water inlet column 15 is not limited to one, and each vortex water inlet column 15 can be separated into a plurality of apertures that allow contaminated groundwater to pass through respectively, and hydrodynamic cavitation can occur simultaneously within the plurality of apertures of each vortex water inlet column 15.

It is to be noted that the above specific embodiments are exemplary, and inspired by the disclosure of the present invention, those skilled in the art can conceive of various solutions, all of which are also encompassed in the scope of the disclosure of the present invention and fall within protection scope of the present invention. It should be appreciated by those skilled in the art that the description of the present invention and its accompanying drawings are illustrative and do not limit the claims. The protection scope of the present invention is defined by the claims and their equivalents. Throughout the text, a feature following the term "preferably" is only an optional way and should not be construed as mandatory, so the applicant reserves the right to abandon or delete relevant preferred features at any time.

The invention claimed is:

1. A groundwater circulation well system with pressure-adjustable hydrodynamic cavitation, the system comprising a plurality of hydrodynamic cavitators (17) which are suspended in a circulation well and produces a hydrodynamic cavitation effect for groundwater under different operating conditions, wherein each of the hydrodynamic cavitators (17) is provided with a vortex chamber (18) and a negative pressure chamber (12) in a flow direction of the groundwater such that hydrodynamic cavitation bubbles generated in the vortex chamber (18) of each of the hydrodynamic cavitators (17) by the contaminated groundwater are capable of collectively breaking in the negative pressure chamber (12) based on a sudden pressure change, energy from collapsing and bursting of the hydrodynamic cavitation bubbles being capable of activating a remediation agent to effectively degrade organic contaminants in the groundwater; and each of the hydrodynamic cavitators (17) is provided, inside the vortex chamber (18) thereof, with a plurality of vortex water inlet columns (15) capable of changing a water passing aperture, in a manner that enables the contaminated groundwater to generate the hydrodynamic cavitation bubbles, each of the hydrodynamic cavitators (17) is capable of changing a bubbling pressure and a breaking pressure of the hydrodynamic cavitation bubbles based on adjustment of a width and length of the water passing aperture of each of the vortex water inlet columns (15), wherein the hydrodynamic cavitators (17) are arranged in parallel in the circulation well according to sizes of the hydrodynamic cavitators (17), and each of the hydrodynamic cavitators (17) is provided with the vortex water inlet columns (15) arranged in its vortex chamber (18) according to the rate of flow to be treated, wherein the vortex water inlet columns (15) for generating the hydrodynamic cavitation bubbles are arranged at an outlet at a tail end of the vortex chamber (18) of each of the hydrodynamic cavitators (17), outlets at tail ends of the vortex water inlet columns (15) are connected to an inlet end of the negative pressure chamber (12) such that the hydrodynamic cavitation bubbles generated by passing through the vortex water inlet columns (15) are capable of directly entering the negative pressure chamber (12); and the hydrodynamic cavitation bubbles break and burst under the effect of a sudden pressure change, and energy generated from bursting is transferred to adjacent hydrodynamic cavitation bubbles to accelerate the process of collective breaking of the hydrodynamic cavitation bubbles.

2. The system according to claim 1, wherein:

the water passing aperture is capable of changing a flow velocity of groundwater in the water passing aperture based on adjusting a cross-sectional size of the water passing aperture, to form the bubbling pressure adapted to flow conditions of groundwater at a current remediation stage or point; and the water passing aperture is capable of controlling growth time of the hydrodynamic cavitation bubbles based on changing a flow distance of the hydrodynamic cavitation bubbles in the water passing aperture, to adjust the breaking pressure to be adapted to the flow conditions of groundwater at the current remediation stage or point, such that each of the hydrodynamic cavitators (17) is capable of controlling a number of the hydrodynamic cavitation bubbles generated, growth time and breaking timing thereof, based on the bubbling pressure and the breaking pressure which are adjustable.

3. The system according to claim 2, wherein each of the hydrodynamic cavitators (17) is configured in such a manner that each of the vortex water inlet columns (15) which is arranged at a different radial positions in the vortex chamber (18) of each of the hydrodynamic cavitators (17) is configured with a water passing apertures of a different optimized size.

4. The system according to claim 3, wherein the contaminated groundwater is capable of generating the hydrodynamic cavitation bubbles based on each of the hydrodynamic cavitators (17), each of the hydrodynamic cavitators (17) is provided with a plurality of rotating mechanisms of different sizes for generating vortices in the vortex chamber (18) of each of the hydrodynamic cavitators (17) such that the groundwater entering the vortex chamber (18) of each of the hydrodynamic cavitators (17), disturbed by the rotating mechanisms, generates vortices of different sizes to accelerate uniform mixing of an oxidizing agent with organic contaminants in the groundwater, wherein:

the plurality of rotating mechanisms of different sizes arranged at water inlet front ends of the vortex water inlet columns (15) are configured to generate low-pressure vortex cores capable of increasing the number of the hydrodynamic cavitation bubbles generated.

5. The system according to claim 4, wherein part of the hydrodynamic cavitation bubbles flows with the groundwater to a tail end of the negative pressure chamber (12), bubble puncturing needles (8) arranged at a water outlet at the tail end of the negative pressure chamber (12) are capable of puncturing the hydrodynamic cavitation bubbles which flow from the vortex water inlet columns (15) into the negative pressure chamber (12) and do not break by itself under a sudden pressure change; and large rotating blades (20) for generating a large-size vortex are provided on an agitation rotating shaft (11) arranged coaxially with the vortex chamber (18) of each of the hydrodynamic cavitators (17) and the negative pressure chamber (12), the agitation rotating shaft (11) being connected to a vortex chamber base (13) arranged at the tail end of the vortex chamber (18) of each of the hydrodynamic cavitators (17) and to a negative pressure chamber base arranged at the tail end of the negative pressure chamber (12), respectively, in a manner capable of maintaining a position and height of each of the hydrodynamic cavitators (17); and small rotating blades (16) for generating small-size vortices are arranged at the front ends of the vortex water inlet columns (15) and connected to the vortex water inlet columns (15) by means of blade fixing rods (28).

6. A hydrodynamic cavitator, wherein the hydrodynamic cavitator (17) comprises a vortex chamber (18) for generating vortices and hydrodynamic cavitation bubbles, wherein, the vortex chamber (18) is provided with a plurality of vortex water inlet columns (15), and each of the vortex water inlet columns has a water passing aperture with an adjustable length and width, in such a manner that the groundwater with different flow conditions is capable of undergoing an adjustable hydrodynamic cavitation effect in the vortex chamber (18), such that the hydrodynamic cavitator (17) is capable of adjusting a bubbling pressure and a breaking pressure of the hydrodynamic cavitation bubbles based on each of the vortex water inlet columns (15) which has the water passing aperture with an adjustable length and width, to control a number of the hydrodynamic cavitation bubbles generated, and growth time and breaking timing thereof, wherein the hydrodynamic cavitator (17) is provided with a vortex chamber (18) and a negative pressure chamber (12) in a flow direction of groundwater such that the hydrodynamic cavitation bubbles generated in the vortex chamber (18) by contaminated groundwater are capable of collectively breaking in the negative pressure chamber (12) based on a sudden pressure change, energy from collapsing and bursting of the hydrodynamic cavitation bubbles being capable of activating a remediation agent to effectively degrade organic contaminants in the groundwater.

7. The hydrodynamic cavitator according to claim 6, wherein each of the vortex water inlet columns (15) for generating the hydrodynamic cavitation bubbles is provided with water passing aperture for groundwater to pass through, and the water passing aperture is capable of changing a flow velocity of groundwater in the water passing aperture based on adjusting a cross-sectional size of the water passing aperture, to form the bubbling pressure adapted to flow conditions of groundwater at a current remediation stage or point; and the water passing aperture is capable of controlling growth time of the hydrodynamic cavitation bubbles based on changing a flow distance of the hydrodynamic cavitation bubbles in the water passing aperture, to adjust the breaking pressure to be adapted to the flow conditions of groundwater at the current remediation stage or point.

8. The hydrodynamic cavitator according to claim 7, wherein one or more axial magnetic attached sheets (14) arranged axially along each of the vortex water inlet columns (15) are attached on a side wall of the water passing aperture, and the water passing aperture is configured to change the width of the water passing aperture by increasing or reducing a number of the axial magnetic attached sheets (14) to adjust the bubbling pressure of the groundwater; and one or more transverse magnetic attached sheets (10) having the same diameter as each of the vortex water inlet columns (15) are attached on a tail end of each of the vortex water inlet columns (15), and the water passing aperture is configured to change the length by increasing or reducing a number of the transverse magnetic attached sheets (10) to adjust the breaking pressure of the hydrodynamic cavitation bubbles in the negative pressure chamber (12).

\* \* \* \* \*